(12) United States Patent
Marro et al.

(10) Patent No.: US 7,359,838 B2
(45) Date of Patent: Apr. 15, 2008

(54) METHOD OF PROCESSING A NOISY SOUND SIGNAL AND DEVICE FOR IMPLEMENTING SAID METHOD

(75) Inventors: Claude Marro, Plouguiel (FR); Cyril Plapous, Perros Guirec (FR); Pascal Scalart, Trebeurden (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 11/662,979

(22) PCT Filed: Sep. 14, 2005

(86) PCT No.: PCT/FR2005/002284

§ 371 (c)(1),
(2), (4) Date: Mar. 16, 2007

(87) PCT Pub. No.: WO2006/032760

PCT Pub. Date: Mar. 30, 2006

(65) Prior Publication Data

US 2007/0255535 A1      Nov. 1, 2007

(30) Foreign Application Priority Data

Sep. 16, 2004   (FR) .................... 04 09819

(51) Int. Cl.
*H04B 15/00*   (2006.01)
*H03F 1/26*    (2006.01)
*G06F 15/00*   (2006.01)

(52) U.S. Cl. ..................................... 702/194
(58) Field of Classification Search ........ 702/194, 702/191, 195
See application file for complete search history.

(56) References Cited

U.S. PATENT DOCUMENTS 6,122,609 A * 9/2000 Scalart et al. ............... 704/226

(Continued)

FOREIGN PATENT DOCUMENTS

FR    2 768 546    3/1999

(Continued)

OTHER PUBLICATIONS

M. Kazama, et al., "Estimation of Speech Components by ACF Analysis in a Noisy Environment" Journal of Sound and Vibration, vol. 241, No. 1, 2001, pp. 41-52.

(Continued)

*Primary Examiner*—Michael Nghiem
*Assistant Examiner*—Cindy D. Khuu
(74) *Attorney, Agent, or Firm*—McKenna Long & Aldridge LLP

(57) ABSTRACT

The invention relates to a method of processing a noisy sound signal and to a device for implementing said method. The inventive method includes the following steps which are performed for each frame of a noisy sound signal, consisting in: applying a frequency-domain transform; estimating a power spectral density (PSD) of the noise for the frame; calculating a first noise reduction filter from the estimated PSD of the noise and from an estimation of the PSD of a wanted signal corresponding to the frame; filtering the frame with the aid of the calculated noise reduction filter, in order to obtain a first noise-corrected estimation for the frame; and obtaining a frame of a second signal from the first noise-corrected estimation of the aforementioned frame, comprising harmonics which are essentially at the same positions as the wanted signal corresponding to the frame of the noisy sound signal.

33 Claims, 5 Drawing Sheets

U.S. PATENT DOCUMENTS

| | | | | |
|---|---|---|---|---|
| 6,415,253 | B1* | 7/2002 | Johnson | 704/210 |
| 6,438,513 | B1* | 8/2002 | Pastor et al. | 702/191 |
| 6,445,801 | B1* | 9/2002 | Pastor et al. | 381/94.2 |
| 6,453,285 | B1* | 9/2002 | Anderson et al. | 704/210 |
| 6,463,408 | B1* | 10/2002 | Krasny et al. | 704/217 |
| 6,549,586 | B2* | 4/2003 | Gustafsson et al. | 375/285 |
| 2003/0187638 | A1* | 10/2003 | Causevic et al. | 704/226 |
| 2004/0064307 | A1* | 4/2004 | Scalart et al. | 704/205 |
| 2005/0278172 | A1* | 12/2005 | Koishida et al. | 704/227 |

FOREIGN PATENT DOCUMENTS

| | | |
|---|---|---|
| GB | 2 398 913 A | 9/2004 |
| JP | 2003-280696 | 10/2003 |

OTHER PUBLICATIONS

J.S. Lim, et al., "Enhancement and Bandwidth Compression of Noisy Speech", Proceedings of the IEEE, vol. 67, pp. 1586-1604, Dec. 1979.

R.E. Crochiere, et al., "Multirate Digital Signal Processing", Prentice Hall, 1983.

S.F. Boll, "Suppression of Acoustic Noise in Speech Using Spectral Subtraction", IEEE Trans. on Audio, Speech and Signal Processing, pp. 113-120, Apr. 1979, vol. 27, No. 2.

O. Cappe, "Elimination of the Musical Noise Phenomenon with the Ephraim and Malah Noise Suppressor", IEEE Trans. on Speech and Audio Processing, pp. 345-349, Apr. 1994, vol. 2, No. 2.

M. Berouti, et al., "Enhancement of speech corrupted by acoustic noise", Int. Conf. on Speech, Signal Processing, pp. 208-211, 1979.

P. Lockwood, et al., "Experiments With a Non-Linear Spectral Subtractor, Hidden Markov Models and the Projection for Robust Speech Recogniton in Cars", Proc. of EUROSPEECH, pp. 79-82, Sep. 1991.

Y. Ephraim, et al., "Speech Enhancement Using a Minimum Mean Square Error Short-Time Spectral Amplitude Estimator", IEEE Trans. on Audio, Speech and Signal Processing, pp. 1109-1121, Dec. 1984, vol. 32, No. 6.

C. Plapous, et al., "A Two-Step Noise Reduction Technique", ICASSP, pp. I-289-I-292, 2004.

R.J. McAulay, et al., "Speech Enhancement Using a Soft-Decision Noise Suppression Filter", IEEE trans. on Audio, Speech and Signal Processing, pp. 137-145, Apr. 1980, vol. 28, No. 2.

Y. Ephraim, et al., "Speech Enhancement Using Optimal Non-Linear Spectral Amplitude Estimation", Int. Conf. on Speech, Signal Processing, pp. 1118-1121, 1983.

R. Martin, "Spectral Subtraction Based on Minimum Statistics", in Signal Processing VII: Theories and Applications, EUSIPCO'94, pp. 1182-1185, 1994.

* cited by examiner

METHOD OF PROCESSING A NOISY SOUND SIGNAL AND DEVICE FOR IMPLEMENTING SAID METHOD

This application claims priority from PCT/FR2005/002284 filed Sep. 14, 2005, which claims priority from French Application No. 04 09819, filed Sep. 16, 2004, both of which are hereby incorporated by reference in their entirety.

BACKGROUND OF THE INVENTION

The present invention relates to the processing of noisy sound signals. It relates in particular to the reduction of the noise present in such signals.

Techniques for reducing noise, that is to say a disturbing signal, within a sound signal are known. They are aimed at taking account of the acoustic environment in which the sound signal appears so as to improve the quality and the intelligibility of this signal. These techniques consist in extracting the useful information from the sound signal considered by performing a processing on this noisy signal. Such techniques apply for example to spoken communications, in applications such as telephony, teleconferencing, videoconferencing where the sound signal is then transmitted between several talkers. They apply moreover in respect of applications of sound pick-up in noisy surroundings, or else of voice recognition, the performance of which is greatly altered when the voice signal is pronounced in a noise-filled environment.

These techniques usually consist in estimating a transfer function of a noise reduction filter, then in carrying out a filtering processing on the basis of a multiplication in the spectral domain. They come within approaches termed "noise reduction by short-term spectral attenuation".

According to these techniques, the sound signal considered x(n) comprises a useful signal component s(n) and a noise component b(n), n representing a temporal index in discrete time. It will however be noted that a representation of the signal in continuous time could also be adopted. The signal x(n) is organized as successive frames x(n,k) of constant length and of index k. Each of these frames is firstly multiplied by a weighting window making it possible to improve the later estimation of the spectral quantities necessary for the calculation of the noise reduction filter. Each frame thus windowed is then analyzed in the spectral domain, for example with the aid of a discrete or fast Fourier transformation. This operation is called short-term Fourier transformation (STFT).

The frequency representation X(k,f) thus obtained of the signal observed, where f is a frequency index, makes it possible at one and the same time to estimate the transfer function H(k,f) of the noise reduction filter, and to apply this filter in the spectral domain by simple multiplication between this transfer function and the short-term spectrum of the noisy signal. The result of the filtering may thus be written:

$$\hat{S}(k,f) = H(k,f)X(k,f).$$

A return to the time domain of the signal obtained is then performed by an inverse spectral transform. The corresponding temporal signal is finally synthesized by a block overlap and add technique (OLA standing for "overlap add") or else by a block save technique (OLS standing for "overlap save"). This operation of reconstructing the signal in the time domain is called inverse short-term Fourier transformation (ISTFT).

A detailed description of the methods of short-term spectral attenuation will be found in the references: J. S. Lim, A. V. Oppenheim, "Enhancement and bandwidth compression of noisy speech", Proceedings of the IEEE, Vol. 67, pp. 1586-1604, 1979; and R. E. Crochiere, L. R. Rabiner, "Multirate digital signal processing", Prentice Hall, 1983.

The short-term spectral attenuation H(k,f) applied to the observation signal X(k,f) over the temporal segment of index k and with the frequency component f, is generally determined on the basis of the estimate of the local signal-to-noise ratio SNR(k,f). A characteristic common to all suppression rules resides in their asymptotic behavior, given by:

$$H(k,f) \approx 1 \text{ for } SNR(k,f) \gg 1$$

$$H(k,f) \approx 0 \text{ for } SNR(k,f) \ll 1.$$

In most techniques, the following assumptions are made: the noise and the useful signal are statistically uncorrelated, the useful signal is intermittent (presence of periods of silence) and the human ear is not sensitive to the signal phase (which is not in general modified by the processing).

Among the suppression rules commonly employed may be cited by way of example: power spectral subtraction, amplitude spectral subtraction and direct implementation of the Wiener filter. For these rules, the short-term estimate of the frequency component f of the useful speech signal may be written respectively:

$$\hat{S}_{SSP}(k,f) = \sqrt{\frac{\gamma_{ss}(k,f)}{\gamma_{ss}(k,f) + \gamma_{bb}(k,f)}} X(k,f) \quad (1)$$

for the power spectral subtraction (see the aforesaid article by J. S. Lim and A. V. Oppenheim);

$$\hat{S}_{SSA}(k,f) = \left[1 - \sqrt{\frac{\gamma_{bb}(k,f)}{\gamma_{ss}(k,f) + \gamma_{bb}(k,f)}}\right] X(k,f) \quad (2)$$

for amplitude spectral subtraction (see S. F. Boll, "Suppression of acoustic noise in speech using spectral subtraction", IEEE Trans. on Audio, Speech and Signal Processing, Vol. 27, No. 2, pp. 113-120, April 1979); and $$\hat{S}_{Wiener}(k,f) = \frac{\gamma_{ss}(k,f)}{\gamma_{ss}(k,f) + \gamma_{bb}(k,f)} X(k,f) \quad (3)$$

for Wiener filtering (cf. aforesaid article by J. S. Lim and A. V. Oppenheim).

In these expressions, $\gamma_{ss}(k,f)$ and $\gamma_{bb}(k,f)$ respectively represent the power spectral densities of the useful signal and of the noise that are present within the frequency component f of the observation signal X(k,f) over the time window of index k.

On the basis of the above expressions, it is possible to study, as a function of the local signal-to-noise ratio measured on a given frequency component f, the behavior of the spectral attenuation applied to the noisy signal. These curves are plotted in FIG. 1 for the abovementioned three short-term suppression rules. It may be noted that the set of rules gives a substantially identical attenuation when the local signal-to-noise ratio is significant (right-hand part of FIG. 1). The optimal power subtraction rule, optimal in the sense of the maximum likelihood for Gaussian models (see O. Cappé, "Elimination of the musical noise phenomenon with the Ephraim and Malah noise suppressor", IEEE Trans. on Speech and Audio Processing, Vol. 2, No. 2, pp. 345-349, April 1994) is still the one for which the power of the noise remains the most significant at the output of the processing. For the three suppression rules, we may note that a small variation in the local signal-to-noise ratio about a cutoff value suffices for switching from the case of total attenuation (H(k,f)≈0) to the case of negligible spectral modification (H(k,f)≈1).

This latter property constitutes one of the causes of the phenomenon dubbed "musical noise". Specifically, the ambient noise, comprising at one and the same time deterministic and random components, can be characterized only during the periods of vocal non-activity. On account of the presence of random components, there are very strong variations between the real contribution of a frequency component f of the noise during the periods of vocal activity and its average estimate made over several frames during the instants of vocal non-activity. On account of this difference, the estimate of the local signal-to-noise ratio may fluctuate about the cutoff level and hence give rise at the output of the processing to spectral components which appear and then disappear and whose average lifetime does not statistically exceed the order of magnitude of the analysis window considered. The generalization of this behavior over the whole of the passband introduces audible and annoying residual noise.

Several studies have endeavored to reduce the influence of this residual noise. The solutions advocated follow several avenues: averaging of the short-term estimates (cf. aforesaid article by S. F. Boll), overestimation of the noise power spectrum (see M. Berouti et al., "Enhancement of speech corrupted by acoustic noise", Int. Conf. on Speech, Signal Processing, pp. 208-211, 1979; and P. Lockwood, J. Boudy, "Experiments with a non-linear spectral subtractor, hidden Markov models and the projection for robust speech recognition in cars", Proc. of EUSIPCO'91, pp. 79-82, 1991), or else tracking of the minima of the noise spectral density (see R. Martin, "Spectral subtraction based on minimum statistics", in Signal Processing VII: Theories and Applications, EUSIPCO'94, pp. 1182-1185, September 1994).

A relatively effective solution for suppressing musical noise consists of an estimator of the power spectral density of the useful signal termed "directed-decision" (see Y. Ephraim, and D. Malah, "Speech enhancement using a minimum mean square error short-time spectral amplitude estimator", IEEE Trans. on Audio, Speech and Signal Processing, Vol. 32, No. 6, pp. 1109-1121, 1984 and the aforesaid article by O. Cappé). This estimator effects a compromise between the instantaneous and long-term power spectral density of the useful signal, thereby making it possible to effectively eliminate the musical noise. It is moreover known to improve this solution by making up the delay inherent in this estimator (see FR2820227 and C. Plapous, C. Marro, L. Mauuary, P. Scalart, "A Two-Step Noise Reduction Technique", ICASSP, May 2004).

Several studies have also pertained to the establishing of new suppression rules based on statistical models of the speech and additive noise signals. These studies have made it possible to introduce new algorithms dubbed "soft-decision" algorithms since they possess an additional degree of freedom with respect to the conventional methods (see R. J. Mac Aulay, M. L. Malpass, "Speech enhancement using a soft-decision noise suppression filter", IEEE trans. on Audio, Speech and Signal Processing, Vol. 28, No. 2, pp. 137-145, April 1980, Y. Ephraim, D. Malah, "Speech enhancement using optimal non-linear spectral amplitude estimation", Int. Conf. on Speech, Signal Processing, pp. 1118-1121, 1983, and Y. Ephraim, D. Malah article, "Speech enhancement using a minimum mean square error short-time spectral amplitude estimator", stated above).

As was mentioned above, the calculation of the short-term spectral attenuation relies on the estimation of the signal-to-noise ratio on each of the spectral components. By way of example, the equations given above each involve the following quantity:

$$SNR(k, f) = \frac{\gamma_{ss}(k, f)}{\gamma_{bb}(k, f)}.$$

Thus, the performance of the noise reduction technique, especially in terms of distortions and of effective reduction of the noise level, are governed by the relevance of this estimator of the signal-to-noise ratio.

This defect constitutes the major limitation of the known speech denoising systems. Specifically, the current denoising systems are incapable of denoising the harmonics characterized by too low a signal-to-noise ratio. In practice, the denoising algorithms use the SNR to detect the presence or the absence of a speech component for each frequency. If the estimated SNR is too unfavorable, then the algorithm considers that there is no signal component and suppresses it. Thus, harmonics may be destroyed by the known denoising systems, although it is known a priori that such harmonics must exist. Now, it should be noted that, in the majority of languages, the voiced sounds (harmonics) represent a very large part of the sounds uttered.

An object of the present invention is to overcome the limitation of the known denoising systems.

Another object of the invention is to improve the performance of noise reduction methods.

Another object of the invention is to propose a sound signal processing which does not distort the signal excessively. In particular, the processing of the signal performed makes it possible to preserve all or part of the harmonics included in this signal.

Another object of the invention is to limit the appearance of musical noise on completion of the sound signal processing.

Another object of the invention is to obtain a good estimate of the harmonic comb of a useful signal.

SUMMARY OF THE INVENTION

The invention thus proposes a method of processing a noisy sound signal organized as successive frames. The process comprises the following steps relating to at least one of said frames:

applying a transform to the frequency domain to said frame of the noisy sound signal;

estimating a power spectral density of the noise for said frame;

calculating a first noise reduction filter on the basis of the estimated power spectral density of the noise and of an estimate of the power spectral density of a useful signal corresponding to said frame;

filtering said frame of the noisy sound signal with the aid of the first noise reduction filter calculated, to obtain a first denoised estimate of said frame; and obtaining a frame of a second signal on the basis of the first denoised estimate of said frame of the noisy sound signal, said frame of the second signal comprising harmonics substantially at the same positions as the useful signal corresponding to said frame of the noisy sound signal.

Such a processing of the noisy sound signal thus makes it possible to obtain a regeneration of harmonicity at the output of a first noise reduction filter applied to the signal. The thus-obtained frame of the second signal is constructed in such a way as to eliminate the distortions of the frame of the denoised signal which may have appeared during the first filtering.

This processing makes it possible to obtain a good estimate of the harmonic comb of the useful signal, which may be the subject of a subsequent utilization.

Advantageously, in the domain of the denoising, the method furthermore comprises the following steps:

calculating a second noise reduction filter on the basis of the estimated power spectral density of the noise and of a combination of the powers of the first denoised estimate of said frame and of the frame of the second signal obtained;

filtering said frame of the noisy sound signal, with the aid of the second noise reduction filter calculated, to obtain a second denoised estimate of said frame; and synthesizing the second denoised estimate of said frame.

In this embodiment, the second noise reduction filter is calculated in such a way as to preserve the harmonics, since it is driven by the signal emanating from the harmonicity regeneration. The second denoised estimate of said frame obtained on completion of the second filtering is thus more efficacious than those obtained in the conventional noise reduction systems, where the harmonics of the input signal are destroyed or at least impaired.

The calculation of the first and, as appropriate, of the second noise reduction filter may comprise a first pass implementing a technique of short-term spectral attenuation. By way of illustration, the following techniques may be cited for example: power spectral subtraction, amplitude spectral subtraction and an open-loop Wiener filter, etc. Advantageously, it may also comprise a second pass implementing a technique of short-term spectral attenuation, such as for example a power spectral subtraction, an amplitude spectral subtraction and an open-loop Wiener filter, etc., and use an estimate of the power spectral density of the useful signal corresponding to said frame taking account of the calculation performed during the first pass.

Advantageously, the obtaining of a frame of a second signal comprising harmonics substantially at the same positions as the useful signal corresponding to said frame of the noisy sound signal comprises the application of a nonlinear function to the first denoised estimate of said frame of the noisy sound signal when said first estimate is in the time domain, and the application of a circular convolution between the first denoised estimate of said frame of the noisy sound signal and of a transform into the frequency domain of a nonlinear function when said first estimate is in the frequency domain.

Said nonlinear function may be, for example, one among: a single-wave rectification function, an absolute value, a maximum between said first denoised estimate of said frame of the noisy sound signal and a threshold, and a minimum between said first denoised estimate of said frame of the noisy sound signal and a threshold.

The invention furthermore proposes a device for processing noisy sound signals, comprising means designed to implement the abovementioned method.

The invention also proposes a computer program on an information medium, this program comprising instructions adapted for the implementation of the abovementioned method, when the program is loaded and executed by computing means.

DESCRIPTION OF PREFERRED EMBODIMENTS

Figure 1:
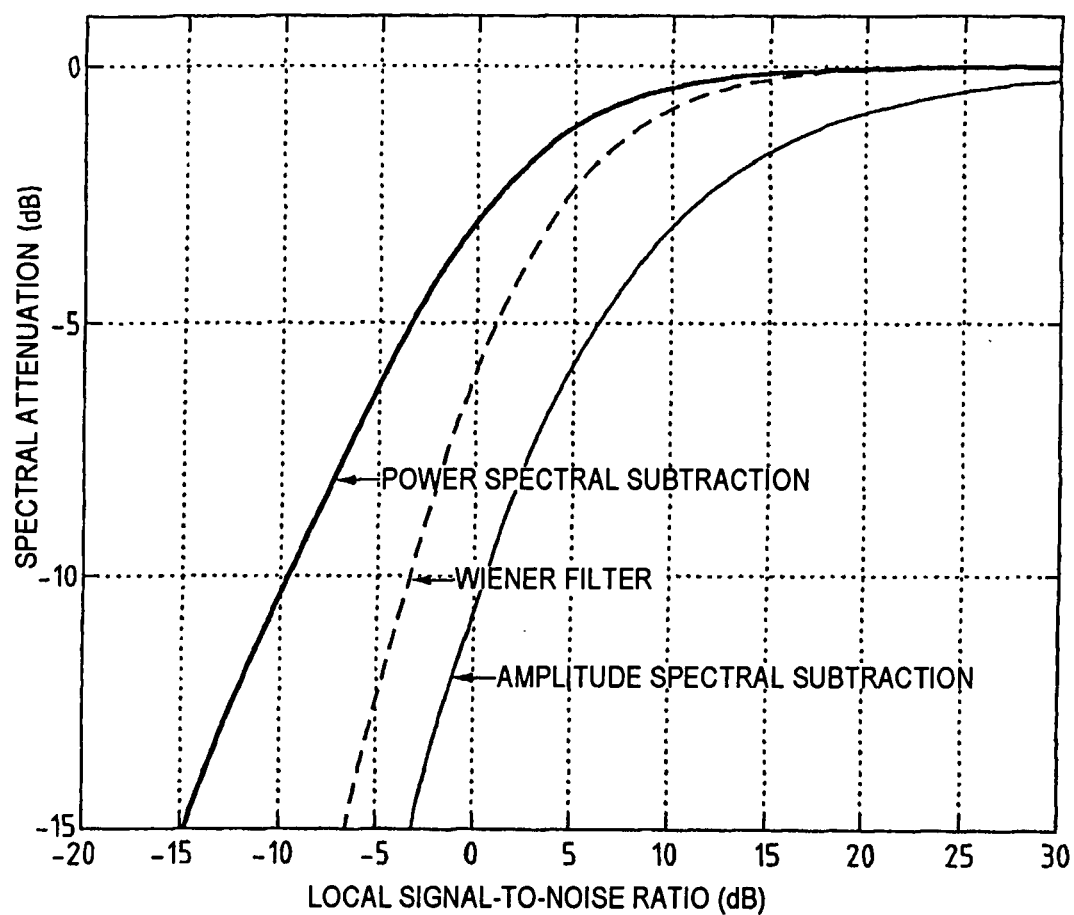
FIG. 1, already commented on, is a diagram comparing the behavior of three known short-term suppression rules.
Figure 2:
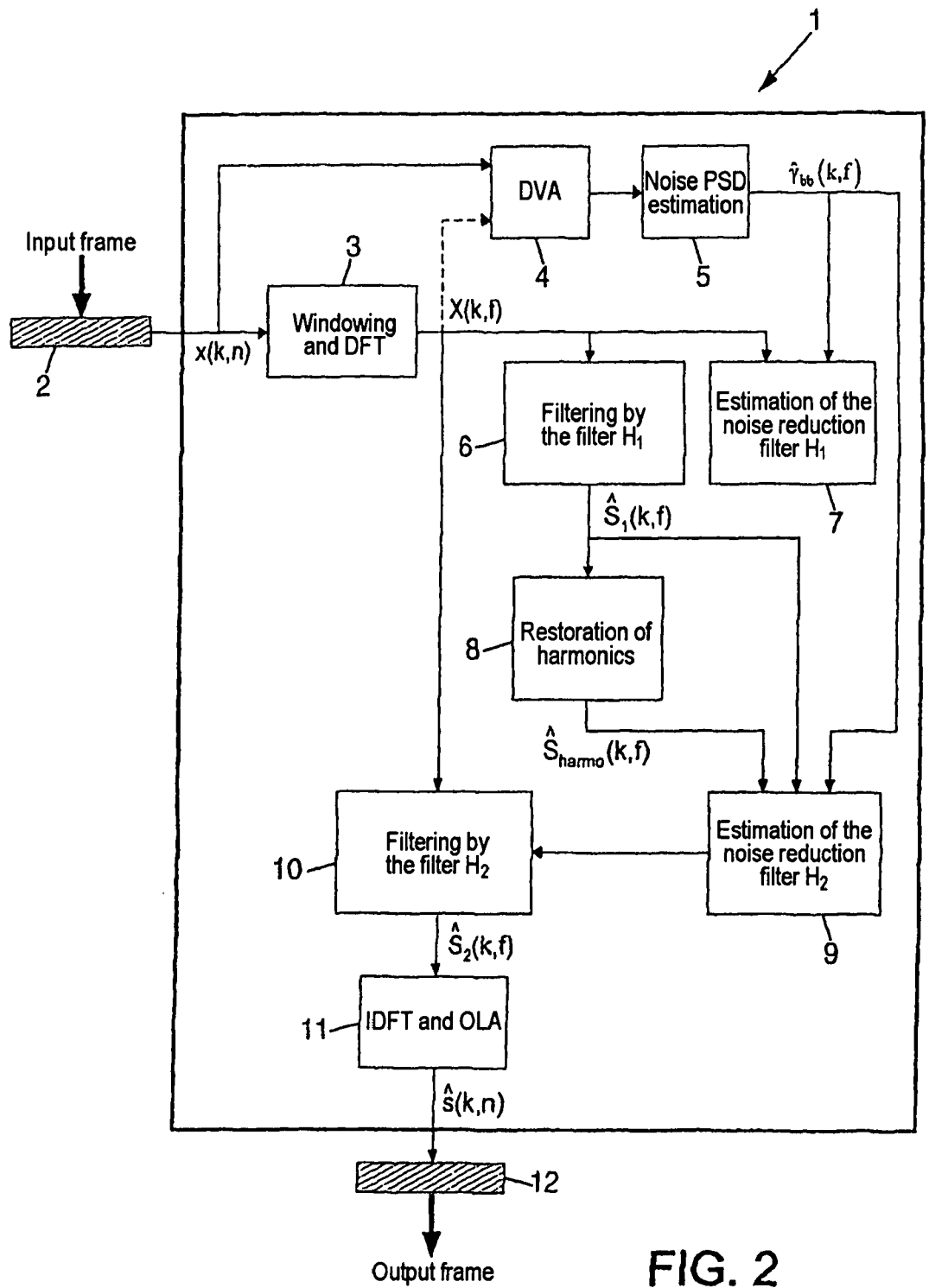
FIG. 2 is a diagram showing various functional blocks able to implement an embodiment of the invention.

FIG. 2 shows a device 1 according to an embodiment of the invention. A current frame 2 of a noisy sound signal enters the device 1 so as to undergo a processing therein. This frame is designated by x(k,n) according to the notation introduced above.

The device 1 comprises an analysis unit 3 whose role is to switch the current frame of the noisy signal x(k,n) into the frequency domain X(k,f). Firstly, the frame is multiplied by a weighting window w(n) which delivers the signal $x_w(k,n)$:

$$x_w(k,n) = w(n)x(k,n).$$

The switch to the frequency domain is then carried out using a discrete Fourier transform (DFT), i.e.:

$$X(k,f) = DFT((x_w(k,n)).$$

The DFT in question may advantageously be implemented by a fast Fourier transform (or FFT). However, other transformations to the frequency domain, such as the wavelet transform are also possible. The same holds for the corresponding inverse operations, that is to say the inverse discrete Fourier transforms (IDFT) which will be mentioned later, for returning to the time domain.

A function 4 for detecting vocal activity (DVA) may moreover advantageously be implemented on the current frame 2. The DVA makes it possible to know when to update the estimate of the power spectral density (PSD) of the noise. Thus, for each "noise only" frame $k_b$ detected by the DVA, the noise power spectral density $\hat{\gamma}_{bb}(k_b,f)$ is estimated by a functional block 5 according to the recursive expression:

$$\hat{\gamma}_{bb}(k_b,f) = \alpha(k_b)\hat{\gamma}_{bb}(k_b-1,f) + ((1-\alpha(k_b))|X(k_b,f)|^2.$$

The parameter $\alpha(k_b)$ controls the smoothing factor. It can vary over time.

If the current frame 2 is not detected as a noise frame, then the estimate of the power spectral density of the noise is pegged, that is to say we retain the last value of PSD obtained for a previous noise frame.

It will be noted that the estimate of $\hat{\gamma}_{bb}(k_b,f)$ is not limited to this exponential-smoothing estimator, any other power spectral density estimator may be used.

Any type of DVA may be used, whether the latter operates in the time domain or in the frequency domain. It is even possible to dispense with such detection of vocal activity.

An estimation of a first noise reduction filter is then performed by the functional block 7 of FIG. 2. The transfer function of this first noise reduction filter is advantageously estimated in the frequency domain by virtue of a two-pass technique (see FR2820227 and C. Plapous, C. Marro, L. Mauuary, P. Scalart, "A Two-Step Noise Reduction Technique", ICASSP, May 2004 stated above). In the first pass, the filter having the following transfer function is calculated:

$$\hat{H}_{step1}(k,f) = f_{step1}((\hat{\gamma}_{ss}(k,f), \hat{\gamma}_{bb}(k,f)).$$

This expression for the transfer function of the filter is a mathematical expression which depends on the PSD of the useful signal $\hat{\gamma}_{ss}(k,f)$ and that of the noise $\hat{\gamma}_{bb}(k,f)$. In this sense, the function $f_{step1}$ may be chosen according to a short-term spectral attenuation technique, so that $\hat{H}_{step1}(k,f)$ implements for example the power spectral subtraction rule (equation (1)), the amplitude spectral subtraction rule (equation (2)), the open-loop Wiener filter rule (equation (3)), etc. Any other frequency-based noise suppression rule may also be implemented to estimate $\hat{H}_{step1}(k,f)$.

The calculation of the noise power spectral density $\hat{\gamma}_{bb}(k_b,f)$ was detailed above. As far as the spectral quantity $\gamma_{ss}(k,f)$ is concerned, it cannot be obtained directly on account of the mixing of the signal and of the noise during the periods of vocal activity. To calculate it, a directed-decision estimator is used (see Y. Ephraim, D. Malah, "Speech enhancement using a minimum mean square error short-time spectral amplitude estimator", stated above), in accordance with the following expression:

$$\hat{\gamma}_{ss}(k,f) = \beta(k)|\hat{S}(k-1,f)|^2 + (1-\beta(k))P[|X(k,f)|^2 - \hat{\gamma}_{bb}(k,f)],$$

where $\beta(k)$ is a barycentric parameter that can vary over time and $\hat{S}(k-1,f)$ is the spectrum of the useful signal estimated in relation to the previous frame of index $k-1$. The function P, which ensures the thresholding of the quantity $(|X(k,f)|^2 - \hat{\gamma}_{bb}(k,f))$ which may possibly be negative in case of an estimation error, is given by:

$$P[z(k,f)] = \begin{cases} z(k,f) & \text{if } z(k,f) > 0 \\ 0 & \text{otherwise.} \end{cases}$$

It will be noted that the estimation of $\hat{\gamma}_{ss}(k,f)$ is not limited to this directed-decision estimator. Specifically, an exponential-smoothing estimator or any other power spectral density estimator may be used.

The transfer function $\hat{H}_{step1}(k,f)$ may thereafter be reused to refine the estimate of the PSD of the useful signal $\hat{\gamma}_{ss}(k,f)$. We then obtain the quantity $\hat{\gamma}_{ss2}(k,f)$ given by:

$$\hat{\gamma}_{ss2}(k,f) = |\hat{H}_{step1}(k,f)X(k,f)|^2.$$

The second pass then consists in calculating the estimator $\hat{H}_1(k,f)$ of the transfer function of the first noise reduction filter on the basis of $\hat{\gamma}_{ss2}(k,f)$, i.e.:

$$\hat{H}_1(k,f) = f_{step2}(\hat{\gamma}_{ss2}(k,f), \hat{\gamma}_{bb}(k,f)).$$

This two-pass calculation, the particular feature of which resides in a "faster" updating of the PSD of the useful signal $\hat{\gamma}_{ss}(k,f)$, confers two advantages on the first noise reduction filter $\hat{H}_1(k,f)$. On the one hand, one obtains faster tracking of the non-stationarities of the useful signal, in particular during fast variations of its temporal envelope (e.g. attacks or extinctions of the speech signal during a silence/speech transition). On the other hand, the noise reduction filter is better estimated, this being manifested through an enhancement of the performance of the method.

$\hat{H}_{step1}(k,f)$ and $\hat{H}_1(k,f)$ may implement a short-term spectral attenuation technique, such as for example the power spectral subtraction rule (equation (1)), the amplitude spectral subtraction rule (equation (2)), or else the open-loop Wiener filter rule (equation (3)). Any other frequency-based noise suppression rule may also be implemented to estimate $\hat{H}_{step1}(k,f)$ and $H_1(k,f)$. Of course, it is also possible to limit oneself to the first pass, without implementing the second.

A filtering is then carried out by the functional block 6 of the device 1, according to the first filter calculated $H_1(k,f)$. It may be performed in the frequency domain, this corresponding to multiplying two spectra. As things stand, this is equivalent to an operation of circular convolution in the time domain. It is thus necessary to take certain precautions to avoid distortions due to temporal aliasing which are manifested when listening by clicks in tempo with the frames. Thus, to satisfy the linear convolution constraint, it is necessary both to add a certain number of null samples to each input frame (so-called "zero padding" technique) and to limit the temporal support of the impulse response of the noise reduction filter (this may be performed in the time domain or frequency domain).

It is noted that, to limit the temporal support of the impulse response of the noise reduction filter, it is possible to introduce a constraint in the time domain, this requiring:
i) a first "inverse" spectral transformation making it possible to obtain the impulse response $h_1(k,n)$ on the basis of the knowledge of the transfer function of the filter $H_1(k,f)$.
ii) a limitation of the number of points of this impulse response, to obtain a truncated temporal filter $h_1'(k,n)$,
iii) a second "direct" spectral transformation making it possible to obtain the modified transfer function of the filter $H_1'(k,f)$ on the basis of the constrained impulse response $h_1'(k,n)$.

The (frequency) transfer function of the noise reduction filter $\hat{H}_1(k,f)$ being available, the (temporal) impulse response $\hat{h}_1(k,n)$ is obtained by means of an inverse discrete Fourier transform (IDFT), i.e.:

$$\hat{h}_1(k,n) = \text{IDFT}(\hat{H}_1(k,f)).$$

This impulse response is then limited temporally by selecting and weighting the most significant $L_{filt1}$ coefficients by a window $w_{filt1}$:

$$\hat{h}_1(k,n) = w_{filt1}(n)\hat{h}_1(k,n).$$

This limitation of the temporal support of the noise reduction filter presents a dual advantage. On the one hand it makes it possible to avoid the problems of temporal aliasing (compliance with the linear convolution). On the other hand, it ensures a smoothing making it possible to avoid the effects of too aggressive a filter.

The transfer function of the noise reduction filter $H_1'(k,f)$ is therefore obtained by discrete Fourier transform (DFT):

$$\hat{H}_1'(k,f) = \text{DFT}(\hat{h}_1'(k,n)).$$

Finally, the first denoised version of the noisy signal is obtained by frequency filtering, that is to say by multiplying the spectrum of the noisy signal and the transfer function of the noise reduction filter, i.e.:

$$\hat{S}_1(k,f) = \hat{H}_1'(k,f)X(k,f).$$

This frequency filtering step may also be carried out in an equivalent manner by a temporal filtering, that is to say by directly filtering $x_w(k,n)$ by $\hat{h}_1'(k,n)$, then doing a discrete Fourier transform (DFT) of the result.

This first estimate of the useful signal $\hat{S}_1(k,f)$ possesses audible distortions since certain harmonics have been suppressed by the noise reduction filter $H_1'(k,f)$, as explained in the introduction. Of course, the level of distortion is directly related to the SNR. The more powerful the noise in a frequency zone, the more prone to degradation are the harmonics of this zone.

To alleviate this drawback, a functional block 8 of the device 1 represented in FIG. 2 creates an artificial signal $\hat{S}_{harmo}(k,f)$ which possesses harmonics just where they had been destroyed or very greatly attenuated.

Figure 3:
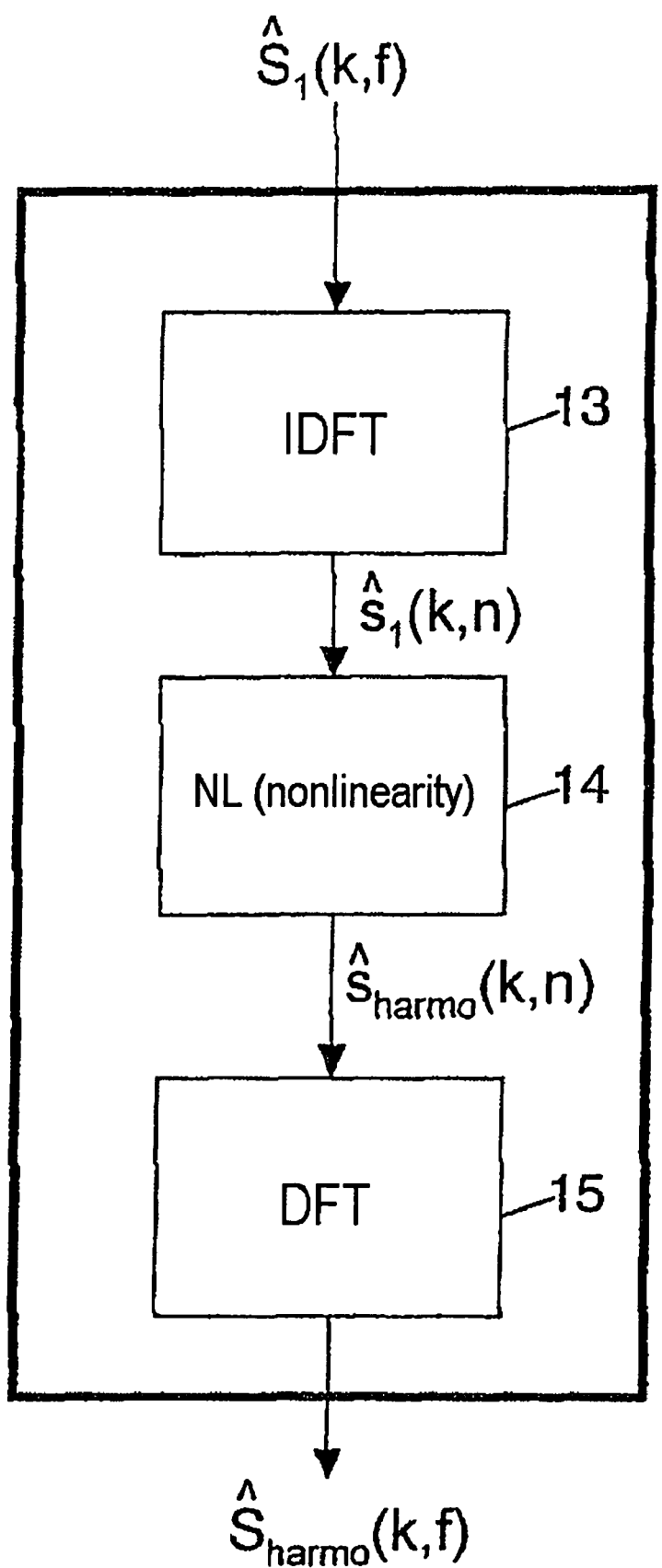
FIG. 3 is a diagram showing an example of restoration of the lost harmonics in a denoised signal.

The signal $\hat{S}_{harmo}(k,f)$ may be obtained in the time domain or in the frequency domain. In the time domain it is possible to restore harmonicity to a signal by applying a nonlinearity to it, for example a function from among: a single-wave rectification function, an absolute value, a minimum/maximum with respect to a threshold, etc. If NL denotes the nonlinear function used, as illustrated in step 14 of FIG. 3, we have:

$$\hat{s}_{harmo}(k,n)=NL(\hat{s}_1(k,n)),$$

where $\hat{s}_1(k,n)$ is obtained, according to step 13 of FIG. 3, by inverse discrete Fourier transform (IDFT):

$$\hat{s}_1(k,n)=\text{IDFT}(\hat{S}_1(k,f)).$$

We then obtain $\hat{S}_{harmo}(k,f)$, as indicated in step 15 of FIG. 3, by discrete Fourier transform (DFT):

$$\hat{S}_{harmo}(k,f)=\text{DFT}(\hat{s}_{harmo}(k,n)).$$

It will be noted that the harmonics are recreated at the same positions as those of the useful signal. This is implicitly ensured by the fact that a temporal nonlinearity is used to restore them.

It will be noted moreover that, in the case where the nonlinearity is applied in the time domain, it is possible to avoid the switch to the frequency domain by applying the nonlinearity to the signal $\hat{s}_1(k,n)$ obtained directly through the convolution of $x_w(k,n)$ and $\hat{h}_1'(k,n)$.

Figure 4:
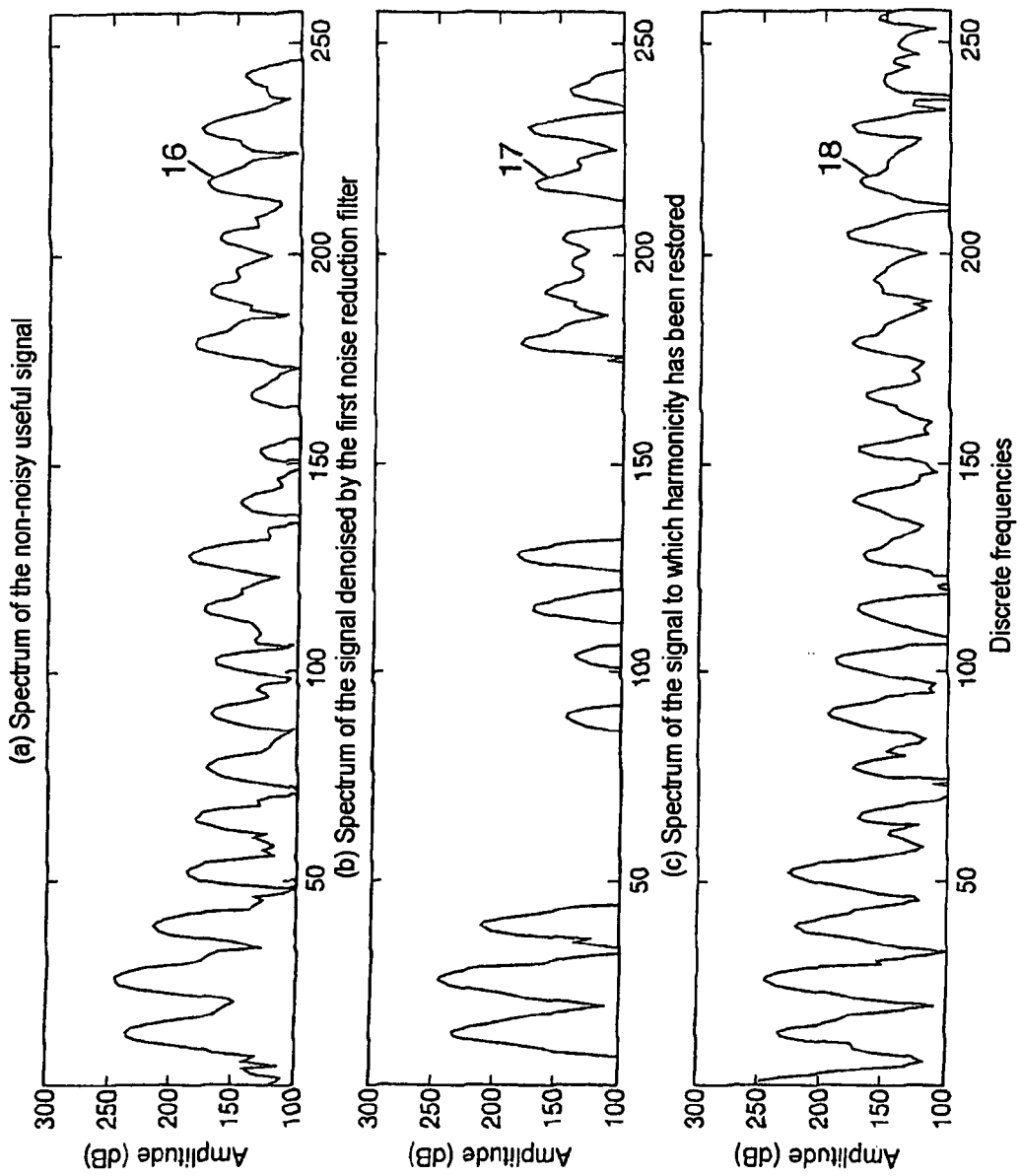
FIG. 4 is a diagram showing the effect of the restoration of harmonics in a signal according to an embodiment of the invention.

FIG. 4 illustrates the effect and the benefit of the nonlinearity. The first spectrum (curve 16) corresponds to a frame of the non-noisy useful signal and serves as reference. The second spectrum (curve 17) corresponds to the signal $\hat{S}_1(k,f)$. It is clearly apparent in this second spectrum that certain harmonics have been completely destroyed and others degraded. The last spectrum (curve 18) corresponds to the signal $\hat{S}_{harmo}(k,f)$ mentioned above. It is apparent that the nonlinearity applied to the signal $\hat{s}_1(k,n)$ has effectively made it possible to recreate the missing harmonics in the signal $\hat{s}_{harmo}(k,n)$. The spectrum of this signal, $\hat{S}_{harmo}(k,f)$, therefore possesses harmonicity information that is very useful in particular for calculating a new noise reduction filter which will be capable of preserving the harmonics that the conventional noise reduction techniques destroy.

The temporal nonlinearity possesses a frequency equivalent which consists in carrying out a circular convolution between the spectrum of the signal $\hat{S}_1(k,f)$ and the spectrum of a signal which possesses the same harmonic structure (at the level of the positions of the harmonics) as the useful signal. Such a spectrum may for example be obtained by virtue of the temporal signal d(k,n) which corresponds to a function of $\hat{s}_1(k,n)$. It is therefore also possible to obtain the signal $\hat{S}_{harmo}(k,f)$ in the frequency domain, in the following manner:

$$\hat{S}_{harmo}(k,f)=\hat{S}_1(k,f)\otimes\text{DFT}(d(k,n)),$$

where the sign $\otimes$ corresponds to the circular convolution operator. If the temporal nonlinearity chosen is the absolute value function, for example, then the signal d(k,n) may be expressed thus, the function sgn designating the sign of the value to which it is applied:

$$d(k,n)=\text{sgn}(\hat{s}_1(k,n)).$$

Thus, the signal $\hat{S}_{harmo}(k,f)$, where it be obtained through a temporal nonlinearity or through a frequency circular convolution, possesses harmonics just where those of $\hat{S}_1(k,f)$ were destroyed or degraded. It constitutes per se a good estimate of the harmonic comb of the denoised signal, in which the harmonics are preserved at the same positions as in the useful signal. This estimate of the harmonic comb is particularly beneficial and may be utilized, in particular, but not exclusively, for denoising purposes.

Advantageously, this signal can moreover make it possible to calculate a noise reduction filter capable of preserving the harmonics normally destroyed by the conventional algorithms, as is described hereinbelow.

It will be noted that the present invention is not limited to the examples described hereinabove to obtain the signal $\hat{S}_{harmo}(k,f)$. It extends in fact to any other method aimed at recreating the harmonics suppressed by the noise reduction filter $H_1'(k,f)$.

Figure 5:
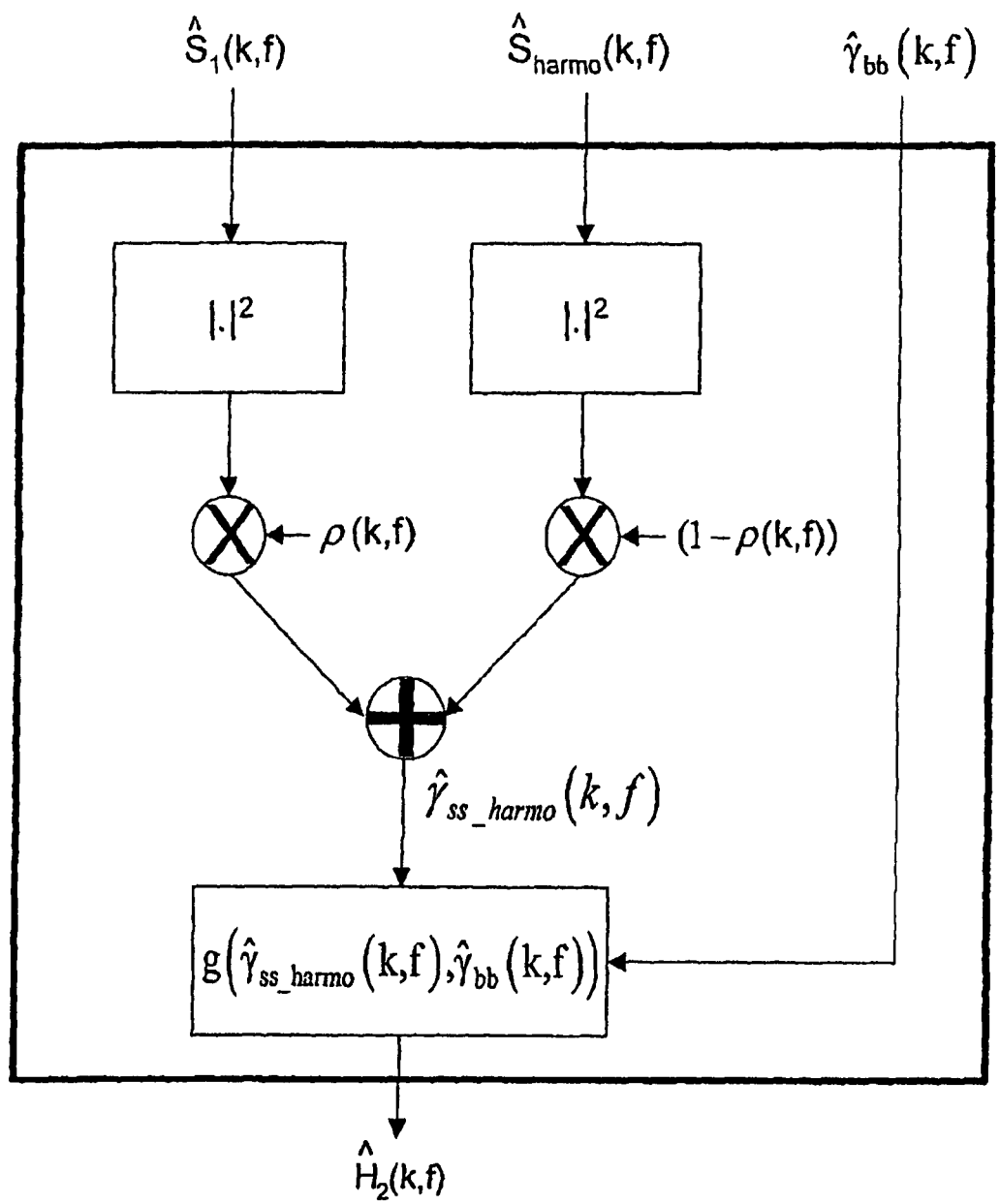
FIG. 5 is a diagram showing an example of estimation of a second noise reduction filter according to an embodiment of the invention.

Advantageously, a second filter is thereafter estimated by the functional block 9 of FIG. 2. The transfer function of this second noise reduction filter $\hat{H}_2(k,f)$ is estimated in the frequency domain, as illustrated in FIG. 5, in the following manner, g representing a function:

$$\hat{H}_2(k,f)=g(\hat{\gamma}_{ss\_harmo}(k,f),\hat{\gamma}_{bb}(k,f)).$$

This expression for the transfer function of the filter is a mathematical expression which depends on the PSD of the noise $\hat{\gamma}_{bb}(k,f)$ and that of the useful signal estimated by virtue of the harmonic restoration step, i.e.:

$$\hat{\gamma}_{ss\_harmo}(k,f)=\rho(k,f)|\hat{S}_1(k,f)|^2+(1-\rho(k,f))|\hat{S}_{harmo}(k,f)|^2.$$

The parameter $\rho(k,f)$ is used to control the level of reinjection of the signal $\hat{S}_{harmo}(k,f)$ in the calculation of the PSD $\gamma_{ss\_harmo}(k,f)$ as a function of the nonlinearity NL which was chosen to create the signal $\hat{S}_{harmo}(k,f)$. It will be noted that this parameter may be fixed or else depend on frequency and/or time.

The function g may be chosen so that $\hat{H}_2(k,f)$ implements for example the power spectral subtraction rule (equation (1)), the amplitude spectral subtraction rule (equation (2)), or else the open-loop Wiener filter rule (equation (3)). Any other frequency-based noise suppression rule may of course be implemented to estimate $\hat{H}_2(k,f)$.

This noise reduction transfer function $\hat{H}_2(k,f)$ possesses the advantage of preserving the harmonics of the signal which are normally destroyed by the conventional noise reduction techniques. This therefore limits the distortions of the denoised signal. It should also be noted that this filter retains the good properties of the filter $\hat{H}_1(k,f)$, that is to say good tracking of the non-stationarities and very little residual musical noise.

A second filtering is thereafter carried out by the functional block 10 of the device 1, on the basis of the second estimated noise reduction filter. Thus, as for the first transfer function, the (temporal) impulse response $\hat{h}_2(k,n)$ equivalent to the (frequency) transfer function of the noise reduction filter $\hat{H}_2(k,f)$ is obtained by means of an inverse discrete Fourier transform (IDFT), that is to say:

$$\hat{h}_2(k,n)=\text{IDFT}(\hat{H}_2(k,f)).$$

This impulse response is thereafter advantageously limited temporally by selecting and weighting the most significant $L_{filt2}$ coefficients by a window $w_{filt2}$, i.e.:

$$\hat{h}_2'(k,n)=w_{filt2}(n)\hat{h}_2(k,n).$$

The transfer function of the noise reduction filter $\hat{H}_2'(k,f)$ is thereafter obtained by discrete Fourier transform (DFT):

$$\hat{H}_2'(k,f)=\text{DFT}(\hat{h}_2'(k,n)).$$

Finally, the denoised frequency frame is obtained by frequency filtering, that is to say by multiplying the spectrum of the noisy signal and the transfer function of the noise reduction filter, i.e.:

$$\hat{S}_2(k,f)=\hat{H}_2'(k,f)X(k,f).$$

This frequency filtering step may also be carried out in an equivalent manner by a temporal filtering, that is to say by directly filtering $x_w(k,n)$ by $\hat{h}_2'(k,n)$. In this case, we obtain directly the signal $\hat{s}(k,n)$ in the time domain.

When the filtering is performed in the frequency domain, it is then advisable to return to the time domain. This is carried out by the functional block 11 of the device 1, by applying an inverse spectral transform (IDFT), i.e.:

$$\hat{s}(k,n)=\text{IDFT}(\hat{S}_2(k,f)).$$

The denoised output signal is thereafter advantageously synthesized by a block overlap and add technique (OLA standing for "overlap add") or else a block save technique (OLS standing for "overlap save"). This operation of reconstructing the signal in the time domain is called inverse short-term Fourier transformation (ISTFT).

On completion of these steps, the frame 12 is obtained at the output of the device 1. This output frame 12 is a denoised estimate of the input frame 2, in which the distortion is limited.

In the rest of the description, advantageous choices of implementation of the invention are described. These choices are exemplary embodiments and should not be regarded as having a limiting nature.

For the implementation of the analysis and the synthesis that are carried out by the functional blocks 3 and 11 of the device 1, the OLA technique is advantageously chosen. There exists moreover an overlap between the frames analyzed. For example, an overlap rate of 50% may be chosen. The current frame 2 of the noisy signal $x(k,n)$ $\{n=0,\ldots,L-1\}$, of length L, is firstly multiplied by a weighting window $w(n)$ which delivers the signal $x_w(k,n)$:

$$x_w(k,n)=w(n)x(k,n).$$

In the example, the window used is a Hanning window of size L:

$$w(n)=0.5-0.5\cos\left(\frac{\pi n}{L}\right) n=0,\ldots,L-1,$$

where L=256, this corresponding to frames of length 32 ms at the sampling frequency Fe=8 kHz.

The switch to the frequency domain is carried out advantageously by using the fast Fourier transform (FFT), numerically optimized version of the discrete Fourier transform (DFT). To get a better frequency resolution and to satisfy the linear convolution constraints, an FFT of length $L_{FFT}$=512 is used. It is therefore necessary beforehand to lengthen the windowed block $x_w(k,n)$ by 256 null samples ("zero-padding")

$$x_{FFT}(k,n) = \begin{cases} x_w(k,n), & n=0,\ldots,L-1 \\ 0, & n=L,\ldots,L_{FFT}-1 \end{cases}.$$

The FFT $X(k,f)$ of the input frame is then obtained by:

$$X(k,f)=\text{FFT}((x_{FFT}(k,n))).$$

A detection of vocal activity may be carried out, optionally, by the functional block 4.

As far as the estimation of the noise power spectral density $\hat{\gamma}_{bb}(k_b,f)$ is concerned, carried out by the functional block 5, it is then possible to proceed advantageously in the following manner. For each "noise only" frame $k_b$ detected by the DVA, the noise power spectral density $\hat{\gamma}_{bb}(k_b,f)$ is estimated by the following recursive expression:

$$\hat{\gamma}_{bb}(k_b,f)=\alpha\hat{\gamma}_{bb}(k_b-1,f)+(1-\alpha)|X(k_b,f)|^2.$$

If the current frame is not detected as a noise frame, then the estimate of the power spectral density of the noise is pegged. The smoothing quantity $\alpha$ is chosen constant and equal to $\alpha$=0.8825, this corresponding to a time constant of 128 ms (having regard to the 50% overlap and the sampling frequency Fe=8 kHz), judged sufficient to ensure a compromise between a reliable estimate and a tracking of the temporal variations of the statistics of the noise.

The transfer function $\hat{H}_{step1}(k,f)$ of the first noise reduction filter estimated by the functional block 7 is advantageously that of an open-loop Wiener filter such that:

$$\hat{H}_{step1}(k,f)=\frac{\eta(k,f)}{1+\eta(k,f)},$$

where $\eta(k,f)$ represents the a priori signal-to-noise ratio (SNR) defined theoretically by the ratio of the estimates of the PSDs of the useful signal $\hat{\gamma}_{ss}(k,f)$ and of the noise $\hat{\gamma}_{bb}(k,f)$, that is to say:

$$\eta(k,f)=\frac{\hat{\gamma}_{ss}(k,f)}{\hat{\gamma}_{bb}(k,f)}.$$

The PSD of the useful signal $\hat{\gamma}_{ss}(k,f)$ is advantageously obtained using a directed-decision estimator, i.e.:

$$\hat{\gamma}_{ss}(k,f)=\beta|\hat{S}(k-1,f)|^2+(1-\beta)P[|X(k,f)|^2-\hat{\gamma}_{bb}(k,f)],$$

where the barycentric parameter $\beta$ is chosen constant and equal to $\beta$=0.98. As indicated above, the function P ensures the thresholding of the quantity weighted by (1−β):

$$P[z(k,f)]=\begin{cases} z(k,f) & \text{if } z(k,f)>0 \\ 0 & \text{otherwise} \end{cases}.$$

The transfer function $\hat{H}_{step1}(k,f)$ is thereafter advantageously reused to refine the estimate of the PSD of the useful signal $\hat{\gamma}_{ss}(k,f)$. One thus obtains the quantity $\hat{\gamma}_{ss2}(k,f)$ given by:

$$\hat{\gamma}_{ss2}(k,f)=|\hat{H}_{step1}(k,f)X(k,f)|^2,$$

which is used to do a second estimate of the a priori signal-to-noise ratio $\eta_2(k,f)$, given by:

$$\eta_2(k, f) = \frac{\hat{\gamma}_{ss2}(k, f)}{\hat{\gamma}_{bb}(k, f)}.$$

A second pass then advantageously consists in the calculation of the estimator of the transfer function $\hat{H}_1(k,f)$ of the first noise reduction filter on the basis of $\eta_2(k,f)$, i.e.:

$$\hat{H}_1(k, f) = \frac{\eta_2(k, f)}{1 + \eta_2(k, f)}.$$

The filtering carried out by the functional block 6 may then be carried out as indicated hereinbelow. The (frequency) transfer function of the noise reduction filter $\hat{H}_1(k,f)$ being available, the corresponding temporal response $\hat{h}_1(k,n)$ is obtained by advantageously using the inverse fast Fourier transform (IFFT), which is a numerically optimized version of the inverse discrete Fourier transform (IDFT), i.e.:

$$\hat{h}_1(k,n) = \text{IFFT}(\hat{H}_1(k,f)).$$

Because the signal $\hat{h}_1(k,n)$ is real, the corresponding temporal filter is firstly rendered causal. The $L_{filt1}=256$ coefficients of this filter corresponding to the samples that are significant for the application envisaged are selected thereafter. The impulse response thus obtained is thereafter weighted by a Hanning window of length $L_{filt1}$. Finally, the weighted impulse response is supplemented with $L_{FFT}-L_{filt1}$ zeros, to give the impulse response $\hat{h}_1'(k,n)$ which complies with the aliasing-free linear convolution constraint.

The transfer function of the noise reduction filter $\hat{H}_1'(k,f)$ is thereafter obtained by advantageously using the fast Fourier transform (FFT), numerically optimized version of the discrete Fourier transform (DFT), i.e.:

$$\hat{H}_1'(k,f) = \text{FFT}(\hat{h}_1'(k,n)).$$

Finally, the first denoised version of the noisy signal is obtained by frequency filtering, that is to say by multiplying the spectrum of the noisy signal and the transfer function of the noise reduction filter:

$$\hat{S}_1(k,f) = \hat{H}_1'(k,f)X(k,f).$$

In the step of restoring the lost harmonics that is performed by the functional block 8, the signal $\hat{S}_1(k,f)$ is thereafter used to create the artificial signal $\hat{S}_{harmo}(k,f)$. Firstly, the temporal signal $\hat{s}_1(k,n)$ is obtained by advantageously using the inverse fast Fourier transform (FFTI):

$$\hat{s}_1(k,n) = \text{IFFT}(\hat{S}_1(k,f)).$$

Thereafter, the single-wave nonlinear rectification function is applied to this signal, this having the aim of restoring harmonicity to it, i.e.:

$$\hat{s}_{harmo}(k,n) = \max(\hat{s}_1(k,n),0).$$

Of course, any other nonlinearity than the single-wave rectification may be used as indicated above (absolute value, maximum/minimum with respect to a threshold, etc.). Finally, the signal $\hat{S}_{harmo}(k,f)$ is obtained by advantageously using the fast Fourier transform (FFT), i.e.:

$$\hat{S}_{harmo}(k,f) = \text{FFT}(\hat{s}_{harmo}(k,n)).$$

This signal is thereafter exploited to advantageously calculate the transfer function of a second noise reduction filter.

In the present exemplary embodiment, the estimate of such a second filter is carried out by the functional block 9 of the device 1 in the following manner. The transfer function of the second noise reduction filter $\hat{H}_2(k,f)$ is that of an open-loop Wiener filter such that:

$$\hat{H}_2(k, f) = \frac{\eta_{harmo}(k, f)}{1 + \eta_{harmo}(k, f)},$$

where $\eta \text{harmo}(k,f)$ represents the a priori signal-to-noise ratio (SNR) defined theoretically by the ratio of the estimates of the PSD of the useful signal $\hat{\gamma}_{ss\_harm}(k,f)$ and of the PSD of the noise $\hat{\gamma}_{bb}(k,f)$, i.e.:

$$\eta_{harmo}(k, f) = \frac{\hat{\gamma}_{ss\_harmo}(k, f)}{\hat{\gamma}_{bb}(k, f)},$$

where the PSD of the useful signal $\hat{\gamma}_{ss\_harmo}(k,f)$ is obtained thus:

$$\hat{\gamma}_{ss\_harmo}(k,f) = \rho(k,f)|\hat{S}_1(k,f)|^2 + (1-\rho(k,f))|\hat{S}_{harmo}(k,f)|^2.$$

The parameter $\rho(k,f)$ for controlling the level of reinjection of the signal $\hat{S}_{harmo}(k,f)$ is chosen fixed and equal to 0.5 for the application envisaged.

The (frequency) transfer function of the noise reduction filter $\hat{H}_2(k,f)$ being available, the corresponding temporal response $\hat{h}_2(k,n)$ is obtained by advantageously using the inverse fast Fourier transform (FFTI), numerically optimized version of the inverse discrete Fourier transform (IDFT):

$$\hat{h}_2(k,n) = \text{IFFT}(\hat{H}_2(k,f)).$$

Because the signal $\hat{h}_2(k,n)$ is real, the corresponding temporal filter is firstly rendered causal. The $L_{filt2}=256$ coefficients of this filter corresponding to the samples that are significant for this application are selected thereafter. The impulse response thus obtained is thereafter weighted by a Hanning window of length $L_{filt2}$. Finally, the weighted impulse response is supplemented with $L_{FFT}-L_{filt2}$ zeros to give the impulse response $\hat{h}_2'(k,n)$ which complies with the aliasing-free linear convolution constraint.

The transfer function of the noise reduction filter $\hat{H}_2'(k,f)$ is thereafter obtained by advantageously using the fast Fourier transform (FFT), numerically optimized version of the discrete Fourier transform (DFT):

$$\hat{H}_2'(k,f) = \text{FFT}(\hat{h}_2'(k,n)).$$

The values of the modulus of the noise reduction filter $\hat{H}_2'(k,f)$ may optionally be thresheld to avoid too aggressive a noise reduction.

Finally, the denoised frequency frame is obtained by frequency filtering carried out by the functional block 10, that is to say by multiplying the spectrum of the noisy signal and the transfer function of the noise reduction filter, i.e.:

$$\hat{S}_2(k,f) = \hat{H}_2'(k,f)X(k,f).$$

The return to the time domain of the signal thus obtained is thereafter performed, at the level of the functional block 11, by inverse spectral transform, by advantageously using the inverse fast Fourier transform (FFTI), that is to say:

$$\hat{s}(k,n) = \text{IDFT}(\hat{S}_2(k,f)).$$

The denoised output signal is thereafter synthesized by the block overlap and add technique OLA.

It will be noted moreover that the device 1 illustrated in FIG. 2 may be placed in a particular piece of equipment, as a function of the application envisaged, such as a piece of sound pick-up equipment, a piece of communication equipment or else a piece of voice recognition equipment.

It will be noted moreover that the processing implemented by the device may be performed in a local manner, as in the case of a communication terminal for example, or else in a manner centralized in a network, for example in the case of a voice recognition server.

Additionally, in a practical manner, a device 1 for processing noisy sound signals, according to the invention, consists of (electronic) hardware means and/or software means suitable for implementing a method of processing a signal, according to the invention.

According to a preferred implementation, the steps of the method of processing a noisy sound signal, according to the invention, are determined by the instructions of a computer program used in such a piece of equipment according to the invention.

The method according to the invention is then implemented when the aforesaid program is loaded into computing means incorporated in the equipment, and the operation of which is then controlled by the execution of the program.

Here, the expression "computer program" is understood to mean one or more computer programs forming a (software) set, the purpose of which is the implementation of the invention, when it is executed by appropriate computing means.

Consequently, the subject matter of the invention is also such a computer program, in particular in the form of a piece of software stored on an information medium. Such an information medium may consist of any entity or device capable of storing a program according to the invention.

For example, the medium in question may comprise a hardware storage means, such as a ROM, for example a CD ROM or a microelectronic circuit ROM, or else a magnetic recording means, for example a hard disk. As a variant, the information medium may be an integrated circuit in which the program is incorporated, the circuit being suitable for executing or for being used in the execution of the method in question.

Moreover, the information medium may also be a transmissible immaterial medium, such as an electrical or optical signal that can be conveyed via an electrical or optical cable, by radio or by other means. A program according to the invention may in particular be downloaded from an Internet-type network.

From a design point of view, a computer program according to the invention can use any programming language and be in the form of source code, object code, or of code intermediate between source code and object code (for example a partially compiled form), or in any other form desirable for implementing a method according to the invention.

The invention claimed is:

1. A method of processing a noisy sound signal organized as successive frames, comprising the following steps relating to at least one of said frames:
    applying a transform to the frequency domain to said frame of the noisy sound signal;
    estimating a power spectral density of the noise for said frame;
    calculating a first noise reduction filter on the basis of the estimated power spectral density of the noise and of an estimate of the power spectral density of a useful signal corresponding to said frame;
    filtering said frame of the noisy sound signal with the aid of the first noise reduction filter calculated, to obtain a first denoised estimate of said frame, and
    obtaining a frame of a second signal on the basis of the first denoised estimate of said frame of the noisy sound signal, said frame of the second signal comprising harmonics substantially at the same positions as the useful signal corresponding to said frame of the noisy sound signal.

2. The method as claimed in claim 1, further comprising the following steps:
    calculating a second noise reduction filter on the basis of the estimated power spectral density of the noise and of a combination of the powers of the first denoised estimate of said frame, and of the frame of the second signal obtained;
    filtering said frame of the noisy sound signal, with the aid of the second noise reduction filter calculated, to obtain a second denoised estimate of said frame; and
    synthesizing the second denoised estimate of said frame.

3. The method as claimed in claim 2, in which, when the result of the filtering performed with the aid of the second noise reduction filter is in the frequency domain, a transform to the time domain is applied to the result of said filtering, before synthesizing the second denoised estimate of said frame.

4. The method as claimed in claim 2, in which the calculation of the second noise reduction filter implements a technique of short-term spectral attenuation.

5. The method as claimed in claim 4, in which the calculation of the second noise reduction filter implements an open-loop Wiener filter having a transfer function of the form $$\hat{H}_2(k, f) = \frac{\eta_{harmo}(k, f)}{1 + \eta_{harmo}(k, f)} \text{ with}$$

$$\eta_{harmo}(k, f) = \frac{\hat{\gamma}_{ss\_harmo}(k, f)}{\hat{\gamma}_{bb}(k, f)} \text{ and}$$

$$\hat{\gamma}_{ss\_harmo}(k, f) = \rho(k, f)|\hat{S}_1(k, f)|^2 + (1 - \rho(k, f))|\hat{S}_{harmo}(k, f)|^2,$$

where $\hat{S}_1(k,f)$ represents the first denoised estimate of said frame of index k, $\hat{S}_{harmo}(k,f)$ represents the frame of the second signal and $\rho(k,f)$ is a reinjection parameter for the second signal.

6. The method as claimed in claim 5, in which $\rho(k,f)$ varies as a function of frequency and/or time.

7. The method as claimed in claim 2, in which the filtering of said frame of the noisy sound signal with the aid of the second noise reduction filter comprises a selection and a weighting of the temporal impulse response of said second noise reduction filter.

8. The method as claimed in claim 7, in which 256 coefficients of the second noise reduction filter are selected and weighted by a Hanning window.

9. The method as claimed in claim 8, in which said transform to the frequency domain applied to said frame of the noisy sound signal is a fast Fourier transform of length 512 and in which the temporal impulse response of said second noise reduction filter is supplemented with 256 zeros.

10. The method as claimed in claim 2, in which the synthesis of the second denoised estimate of said frame uses an OLA block overlap and add or an OLS block save.

11. The method as claimed in claim 1, in which said frame of the noisy sound signal is multiplied by a weighting window before applying a transform to the frequency domain thereto.

12. The method as claimed in claim 11, in which said weighting window is a Hanning window whose size is the length L of said frame of the noisy sound signal.

13. The method as claimed in claim 12, in which said weighting window is of the form $$w(n) = 0.5 - 0.5 \cdot \cos\left(\frac{\pi n}{L}\right),$$

where n is an integer ranging from 0 to L−1 and where L is equal to 256.

14. The method as claimed in claim 1, in which said transform to the frequency domain applied to said frame of the noisy sound signal is a fast Fourier transform of length 512.

15. The method as claimed in claim 1, in which vocal activity is searched for in said frame of the noisy sound signal, and in which the estimate of the power spectral density of the noise for said frame corresponds to an estimate of the power spectral density of the noise included in said frame when no vocal activity is detected in said frame and to an estimate of the power spectral density of the noise included in at least one frame of the noisy sound signal preceding said frame when vocal activity is detected in said frame.

16. The method as claimed in claim 15, in which the power spectral density of the noise included in at least one frame of index kb of the noisy sound signal, in which frame no vocal activity is detected, is effected by exponential smoothing of the form $\hat{\gamma}_{bb}(k_b,f) = \alpha \hat{\gamma}_{bb}(k-1,f) + (1-\alpha)|X(k_b,f)|^2$, where $X(k_b,f)$ represents the transform to the frequency domain of the frame of index kb of the noisy sound signal and α is a smoothing quantity.

17. The method as claimed in claim 1, in which the calculation of the first noise reduction filter comprises a first pass implementing a technique of short-term spectral attenuation.

18. The method as claimed in claim 17, in which the calculation of the first noise reduction filter comprises a first pass implementing an open-loop Wiener filter having a transfer function of the form $$\hat{H}_{step1}(k, f) = \frac{\eta(k, f)}{1 + \eta(k, f)}$$

where k is an index of said frame of the noisy sound signal and η(k,f) represents a ratio of the estimate of the power spectral density of the useful signal corresponding to said frame by the estimated power spectral density of the noise.

19. The method as claimed in claim 18, in which the estimate of the power spectral density of a useful signal corresponding to said frame comprises a directed-decision estimate of the form $\hat{\gamma}_{ss}(k,f) = \beta|\hat{S}(k-1,f)|^2 + (1-\beta) P[|X(k,f)|^2 - \hat{\gamma}_{bb}(k,f)]$, where β is a barycentric parameter, or an exponential-smoothing estimate.

20. The method as claimed in claim 17, in which the calculation of the first noise reduction filter further comprises a second pass implementing a technique of short-term spectral attenuation, and in which the estimate of the power spectral density of the useful signal corresponding to said frame takes account of the calculation performed during the first pass.

21. The method as claimed in claim 20, in which the estimate of the power spectral density of the useful signal corresponding to said frame taking account of the calculation performed during the first pass is of the form $\hat{\gamma}_{ss2}(k,f) = |\hat{H}_{step1}(k,f)X(k,f)|^2$, where $\hat{H}_{step1}(k,f)$ represents a transfer function calculated during the first pass and X(k,f) represents the transform to the frequency domain of said frame of index k of the noisy sound signal, and in which the calculation of the first noise reduction filter comprises a second pass implementing an open-loop Wiener filter having a transfer function of the form $$\hat{H}_1(k, f) = \frac{\eta_2(k, f)}{1 + \eta_2(k, f)},$$

where $\eta_2(k,f)$ represents a ratio of the estimate of the power spectral density of the useful signal corresponding to said frame taking account of the calculation performed during the first pass by the estimated power spectral density of the noise.

22. The method as claimed in claim 1, in which the filtering of said frame of the noisy sound signal with the aid of the first noise reduction filter is performed on the transform to the frequency domain of said frame.

23. The method as claimed in claim 1, in which the filtering of said frame of the noisy sound signal with the aid of the first noise reduction filter comprises a selection of coefficients of said first noise reduction filter and a weighting of the temporal impulse response of said first noise reduction filter.

24. The method as claimed in claim 23, in which 256 coefficients of the first noise reduction filter are selected and weighted by a Hanning window.

25. The method as claimed in claim 24, in which said transform to the frequency domain applied to said frame of the noisy sound signal is a fast Fourier transform of length 512 and in which the temporal impulse response of said first noise reduction filter is supplemented with 256 zeros.

26. The method as claimed in claim 1, in which the obtaining of a frame of a second signal comprising harmonics substantially at the same positions as the useful signal corresponding to said frame of the noisy sound signal comprises the application of a nonlinear function to the first denoised estimate of said frame of the noisy sound signal when said first estimate is in the time domain, and the application of a circular convolution between the first denoised estimate of said frame of the noisy sound signal and of a transform into the frequency domain of a nonlinear function when said first estimate is in the frequency domain.

27. The method as claimed in claim 26, in which said nonlinear function is one among: a single-wave rectification function, an absolute value, a maximum between said first denoised estimate of said frame of the noisy sound signal and a threshold, and a minimum between said first denoised estimate of said frame of the noisy sound signal and a threshold.

28. The method as claimed in claim 1, in which the filtering of said frame of the noisy sound signal with the aid of the second noise reduction filter is performed on the transform to the frequency domain of said frame.

29. A device for processing a noisy sound signal organized as successive frames, comprising:
- means for applying a transform to the frequency domain to said frame of the noisy sound signal;
- an estimator for estimating a power spectral density of the noise for said frame;
- a calculator for calculating a first noise reduction filter on the basis of the estimated power spectral density of the noise and of an estimate of the power spectral density of a useful signal corresponding to said frame;
- a filter for filtering said frame of the noisy sound signal with the aid of the first noise reduction filter calculated, to obtain a first denoised estimate of said frame; and
- means for obtaining a frame of a second signal on the basis of the first denoised estimate of said frame of the noisy sound signal, said frame of the second signal comprising harmonics substantially at the same positions as the useful signal corresponding to said frame of the noisy sound signal.

30. A piece of sound pick-up equipment incorporating a device for processing a noisy sound signal organized as successive frames, the device comprising:
- means for applying a transform to the frequency domain to said frame of the noisy sound signal;
- an estimator for estimating a power spectral density of the noise for said frame;
- a calculator for calculating a first noise reduction filter on the basis of the estimated power spectral density of the noise and of an estimate of the power spectral density of a useful signal corresponding to said frame;
- a filter for filtering said frame of the noisy sound signal with the aid of the first noise reduction filter calculated, to obtain a first denoised estimate of said frame; and
- means for obtaining a frame of a second signal on the basis of the first denoised estimate of said frame of the noisy sound signal, said frame of the second signal comprising harmonics substantially at the same positions as the useful signal corresponding to said frame of the noisy sound signal.

31. A piece of communication equipment incorporating a device for processing a noisy sound signal organized as successive frames, the device comprising:
- means for applying a transform to the frequency domain to said frame of the noisy sound signal;
- an estimator for estimating a power spectral density of the noise for said frame;
- a calculator for calculating a first noise reduction filter on the basis of the estimated power spectral density of the noise and of an estimate of the power spectral density of a useful signal corresponding to said frame;
- a filter for filtering said frame of the noisy sound signal with the aid of the first noise reduction filter calculated, to obtain a first denoised estimate of said frame; and
- means for obtaining a frame of a second signal on the basis of the first denoised estimate of said frame of the noisy sound signal, said frame of the second signal comprising harmonics substantially at the same positions as the useful signal corresponding to said frame of the noisy sound signal.

32. A piece of voice recognition equipment incorporating a device for processing a noisy sound signal organized as successive frames, the device comprising:
- means for applying a transform to the frequency domain to said frame of the noisy sound signal;
- an estimator for estimating a power spectral density of the noise for said frame;
- a calculator for calculating a first noise reduction filter on the basis of the estimated power spectral density of the noise and of an estimate of the power spectral density of a useful signal corresponding to said frame;
- a filter for filtering said frame of the noisy sound signal with the aid of the first noise reduction filter calculated, to obtain a first denoised estimate of said frame; and
- means for obtaining a frame of a second signal on the basis of the first denoised estimate of said frame of the noisy sound signal, said frame of the second signal comprising harmonics substantially at the same positions as the useful signal corresponding to said frame of the noisy sound signal.

33. A computer program on a computer-readable medium, comprising instructions adapted for implementing, when said program is loaded and executed by computing means, the following steps, relating to at least one of said frames, of a method of processing a noisy sound signal organized as successive frames:
- applying a transform to the frequency domain to said frame of the noisy sound signal;
- estimating a power spectral density of the noise for said frame;
- calculating a first noise reduction filter on the basis of the estimated power spectral density of the noise and of an estimate of the power spectral density of a useful signal corresponding to said frame;
- filtering said frame of the noisy sound signal with the aid of the first noise reduction filter calculated, to obtain a first denoised estimate of said frame; and
- obtaining a frame of a second signal on the basis of the first denoised estimate of said frame of the noisy sound signal, said frame of the second signal comprising harmonics substantially at the same positions as the useful signal corresponding to said frame of the noisy sound signal.

* * * * *